US012091216B2

(12) United States Patent
Siöland et al.

(10) Patent No.: US 12,091,216 B2
(45) Date of Patent: Sep. 17, 2024

(54) PACKAGING CONTAINER COMPRISING A CONTAINER BODY AND A BASE DISC

(71) Applicant: AR Packaging Systems AB, Lund (SE)

(72) Inventors: Maria Siöland, Kristianstad (SE); Lennart Larsson, Malmö (SE)

(73) Assignee: AR Packaging Systems AB, Lund (SE)

( * ) Notice: Subject to any disclaimer, the term of this patent is extended or adjusted under 35 U.S.C. 154(b) by 217 days.

(21) Appl. No.: 17/774,295

(22) PCT Filed: Nov. 5, 2019

(86) PCT No.: PCT/EP2019/080177
§ 371 (c)(1),
(2) Date: May 4, 2022

(87) PCT Pub. No.: WO2021/089118
PCT Pub. Date: May 14, 2021

(65) Prior Publication Data
US 2022/0388710 A1    Dec. 8, 2022

(51) Int. Cl.
*B65D 3/22*    (2006.01)
*B32B 1/00*    (2024.01)
(Continued)

(52) U.S. Cl.
CPC ................. *B65D 3/22* (2013.01); *B32B 1/00* (2013.01); *B32B 15/08* (2013.01); *B32B 15/12* (2013.01);
(Continued)

(58) Field of Classification Search
CPC ... B65D 3/22; B65D 3/02; B65D 3/12; B65D 3/268; B65D 21/022; B65D 51/20;
(Continued)

(56) References Cited

U.S. PATENT DOCUMENTS 10,759,155 B2 *   9/2020   Toft .......................... B65B 9/20
10,787,280 B2 *   9/2020   Herlin .................. B65D 43/163
(Continued)

FOREIGN PATENT DOCUMENTS

EP    3409470 A1    12/2018
EP    3546387 A1    10/2019
(Continued)

OTHER PUBLICATIONS

English translation of WO-2019068384-A1 from Espacenet. (Year: 2024).*
(Continued)

*Primary Examiner* — James N Smalley
(74) *Attorney, Agent, or Firm* — Womble Bond Dickinson (US) LLP

(57) ABSTRACT

Disclosed is a packaging container comprising a container body having a bottom end and a top end. The container body comprises a tubular container wall. The packaging container is closed at the bottom end by a base disc which is attached to the inner surface of the container body at the bottom end of the container body. The packaging container comprises a top end closure including a lid. The container body comprises a laminate body sheet material comprising a carton layer and a thermoplastic welding layer being arranged on an inner surface of the container body. The base disc comprises a laminate base sheet material comprising a carton layer and an inner thermoplastic welding layer being arranged on a surface of the base disc which is facing towards the interior of the container body.

15 Claims, 6 Drawing Sheets

(51) Int. Cl.
| | |
|---|---|
| *B32B 15/08* | (2006.01) |
| *B32B 15/12* | (2006.01) |
| *B32B 27/10* | (2006.01) |
| *B32B 27/32* | (2006.01) |
| *B65D 3/02* | (2006.01) |
| *B65D 3/12* | (2006.01) |
| *B65D 3/26* | (2006.01) |
| *B65D 21/02* | (2006.01) |
| *B65D 43/16* | (2006.01) |
| *B65D 43/22* | (2006.01) |
| *B65D 51/20* | (2006.01) |

(52) U.S. Cl.
CPC .............. *B32B 27/10* (2013.01); *B32B 27/32* (2013.01); *B65D 3/02* (2013.01); *B65D 3/12* (2013.01); *B65D 3/268* (2013.01); *B65D 21/022* (2013.01); *B65D 43/169* (2013.01); *B65D 43/22* (2013.01); *B65D 51/20* (2013.01); *B32B 2255/12* (2013.01); *B32B 2255/26* (2013.01); *B32B 2307/31* (2013.01); *B32B 2307/4026* (2013.01); *B32B 2307/718* (2013.01); *B32B 2307/7244* (2013.01); *B32B 2307/7246* (2013.01); *B32B 2307/732* (2013.01); *B32B 2439/62* (2013.01); *B32B 2439/70* (2013.01); *B65D 2251/0021* (2013.01); *B65D 2251/0093* (2013.01); *B65D 2543/00101* (2013.01); *B65D 2543/00981* (2013.01)

(58) Field of Classification Search
CPC .. B65D 2251/0021; B65D 2543/00101; B65D 2543/00981; B32B 1/00; B32B 15/08; B32B 15/12; B32B 27/10; B32B 27/32; B32B 2255/12; B32B 2255/26; B32B 2307/31; B32B 2307/4026; B32B 2307/718; B32B 2307/7244; B32B 2307/7246; B32B 2307/732; B32B 2439/62; B32B 2439/70

See application file for complete search history.

(56) References Cited

U.S. PATENT DOCUMENTS

| | | |
|---|---|---|
| 2006/0057315 A1 | 3/2006 | De Coninck et al. |
| 2008/0041861 A1* | 2/2008 | Crawford ................ B65B 31/00 220/697 |
| 2018/0016038 A1 | 1/2018 | Herlin et al. |

FOREIGN PATENT DOCUMENTS

| | | |
|---|---|---|
| JP | 2004-535993 | 12/2004 |
| JP | 2015-174690 | 10/2015 |
| JP | 2015-534524 | 12/2015 |
| JP | 2017-226221 | 12/2017 |
| JP | 2019-137067 | 8/2019 |
| SE | 1651162 A1 | 3/2018 |
| WO | WO 02/102670 A1 | 12/2002 |
| WO | 2006068585 A1 | 6/2006 |
| WO | 2018009130 A1 | 1/2018 |
| WO | 2018009134 A1 | 1/2018 |
| WO | WO 2018/009134 | 1/2018 |
| WO | WO-2019068384 A1 * | 4/2019 |

OTHER PUBLICATIONS

English translation of Notice of Reasons for Rejection for Japanese Application No. 2022-526057 dated Jun. 12, 2023.
International Search Report for Application No. PCT/EP2019/080177 mailed Jul. 30, 2020, pp. 1-3.

* cited by examiner

PACKAGING CONTAINER COMPRISING A CONTAINER BODY AND A BASE DISC

CROSS-REFERENCE TO RELATED APPLICATIONS

This application is a national phase entry under 35 U.S.C. § 371 of International Application No. PCT/EP2019/080177, filed on Nov. 5, 2019, published in English, the disclosure of which is hereby incorporated herein by reference.

TECHNICAL FIELD

The disclosure pertains to a packaging container comprising a container body having a bottom end and a top end, the container body comprising a tubular container wall extending in a height direction of the packaging container from the bottom end to the top end. The packaging container is closed at the bottom end by a base disc which is attached at the bottom end of the container body to an inner surface of the container body. The packaging container comprises a top end closure including an openable and reclosable lid. The container body comprises a laminate body sheet material comprising a carton layer, optionally a metallic foil layer and a thermoplastic welding layer being arranged on the inner surface of the container body, with the metallic foil layer, if present, being arranged between the carton layer and the thermoplastic welding layer. The base disc comprises a laminate base sheet material comprising a carton layer, optionally a metallic foil layer and a thermoplastic polymeric layer being arranged at an inner surface of the carton layer facing towards an interior of the container body, with the metallic foil layer, if present, being arranged between the carton layer and the thermoplastic polymeric layer.

BACKGROUND OF THE INVENTION

In the area of disposable packaging containers for products such as infant formula, tobacco, detergents, etc. there is an ongoing need of diminishing the carbon footprint of such products, as well as being able to reduce production costs. A generally contradictory demand on the packaging containers is that they should be stackable, crush resistant and have good resistance to air and moisture permeation. To meet this demand, a common type of packaging container has a container body which is made from a laminate sheet material comprising a carton layer, i.e. a layer made from cellulosic fibres, which is often covered on the inside by a metal foil layer, such as an aluminium foil layer and a thermoplastic film layer overlaying the foil layer. The outside of the carton layer may be printed and may be provided with a coating, such as a pigmented coating. An additional polymeric layer may be arranged on the outside of the carton layer. The bottom of the packaging container may be made from a base disc which is attached to the container body at the bottom end thereof. In order to obtain good air and moisture penetration resistance for the whole interior space in the packaging container, also the base disc may be made from a laminate sheet material comprising a carton layer and inner layers of thermoplastic film and optionally a metal foil layer.

It is an object of the present disclosure to offer a packaging container having a reduced carbon footprint and lowered production costs while retaining adequate properties with regard to stackability, crush resistance and resistance to air and moisture permeation.

SUMMARY OF THE INVENTION

The above object may be achieved with a packaging container in accordance with claim 1. Further embodiments are set out in the dependent claims, in the following description and in the drawings.

As set out herein, the packaging container comprises a container body having a bottom end and a top end. The container body comprises a tubular container wall extending in a height direction of the packaging container from the bottom end to the top end and having an inner surface facing towards an interior of the container body and an outer surface facing away from the interior of the container body. The packaging container is closed at the bottom end by a base disc which is attached by welding to the inner surface of the container body at the bottom end of the container body. The packaging container comprises a top end closure comprising an openable and reclosable lid. The container body comprises a laminate body sheet material comprising a carton layer and a thermoplastic welding layer being arranged on the inner surface of the container body. The base disc comprises a laminate base sheet material comprising a carton layer and a thermoplastic welding layer being arranged on a surface of the carton layer which is facing towards the interior of the container body. The thermoplastic welding layer of the laminate body sheet material may have a basis weight of from 12 $g/m^2$ to 75 $g/m^2$, such as from, 20 $g/m^2$ to 70 $g/m^2$, such as from 35 $g/m^2$ to 65 $g/m^2$, such as from 40 $g/m^2$ to 60 $g/m^2$, such as from 45 $g/m^2$ to 55 $g/m^2$. A combined basis weight of the thermoplastic welding layer of the laminate body sheet material and the thermoplastic welding layer of the base sheet material may be from 50 $g/m^2$ to 160 $g/m^2$, such as from 70 $g/m^2$ to 150 $g/m^2$ such as from 80 $g/m^2$ to 140 $g/m^2$, or from 90 $g/m^2$ to 130 $g/m^2$.

A thermoplastic welding layer as referred to herein is a thermoplastic layer which is involved in forming one or more welded joins or seals in a packaging container as disclosed herein. The thermoplastic layer may comprise two or more sub-layers which together form the thermoplastic welding layer. A welded join or seal may be a weld seal between the inner surface of the container body and the base disc, a weld seal between the inner sealing member and the inner surface of the container body, etc.

As disclosed herein, the laminate base sheet material may comprise a metallic foil layer, the metallic foil layer being arranged between the carton layer and the thermoplastic welding layer of the laminate base sheet material. A further polymeric bonding layer may be arranged between the carton layer and the metallic foil layer.

Correspondingly, the laminate body sheet material may comprise a metallic foil layer, the metallic foil layer being arranged between the carton layer and the thermoplastic welding layer of the laminate body sheet material. A further polymeric bonding layer may be arranged between the carton layer and the metallic foil layer.

The metallic foil layer of the laminate base sheet material and of the body sheet material may have a thickness of from 4 micrometer to 10 micrometer, such as from 5 micrometer to 7 micrometer, such as from 5.5 micrometer to 6.5 micrometer.

A laminate body sheet material which may be used in a packaging container as disclosed herein may comprise one or more layers in addition to the mandatory structural carton layer and the inner thermoplastic welding layer. As seen in order from the outside to the inside, the laminate body sheet material may have the following structure:

a) an optional polymeric coating, such as a laquer, b) an optional printed and/or coloured layer
c) a carton layer
d) an optional polymeric bonding layer, e.g. a polyethylene (PE) layer
e) an optional barrier layer, e.g. an aluminum (Al) foil barrier layer
f) an inner thermoplastic welding layer, such as a polyethylene (PE) layer. The inner thermoplastic welding layer may consist of two or more sub-layers, such as a polyethylene (PE) layer and a low density polyethylene (LDPE) layer. The sublayers may be coextruded to form the inside polymeric layer, or may be formed as separate films which are laminated together.

Correspondingly, the inner thermoplastic layer of the laminate base sheet material may consist of two or more sublayers.

The top end closure may comprise a fully or partly removable inner sealing member which is attached by welding to the inner surface of the container body at a distance from the top end of the container body, the inner sealing member comprising a first laminate sealing member sheet material comprising a structural layer and a first thermoplastic welding layer. As set out herein, the structural layer is preferably a metallic foil layer but may alternatively be a paper layer or a paperboard layer.

The fully or partly removable inner sealing member may be a tearable inner sealing member and the structural layer of the first laminate sealing member sheet material may be a metallic foil layer having a thickness of from 5 micrometer to 10 micrometer, such as from 5.5 micrometer to 9 micrometer.

The tearable inner sealing member may comprise a second laminate sealing member sheet material comprising a structural layer such as a metallic foil layer or a paper layer and a thermoplastic welding layer. The second laminate sealing member sheet material may be joined to the first laminate sealing member sheet material by welding in one or more discrete welding areas. The structural layer of the second laminate sealing member sheet material may be a metallic foil layer having a thickness of from 8 micrometer to 17 micrometer, such as from 10 micrometer to 15 micrometer.

Alternatively, the removable inner sealing member may be a peelable inner sealing member and the structural layer of the first laminate sealing member sheet may be a metallic foil layer having a thickness of from 9 micrometer to 45 micrometer, such as from 11 micrometer to 30 micrometer, such as from 12 micrometer to 16 micrometer.

In the packaging containers as disclosed herein, a combined basis weight of the thermoplastic welding layer of the first laminate sealing member sheet material and the thermoplastic welding layer of the laminate body sheet material may be from 25 $g/m^2$ to 160 $g/m^2$, such as from 30 $g/m^2$ to 155 $g/m^2$, such as from 40 $g/m^2$ to 150 $g/m^2$, such as from 70 $g/m^2$ to 145 $g/m^2$, such as from 80 $g/m^2$ to 140 $g/m^2$.

An inner sealing member may be fully or partly removed by a user in order to provide initial access to an interior compartment of the packaging container either by breaking a seal between the inner sealing member and the inner surface of the container wall, or by tearing or otherwise breaking the inner sealing member itself. The inner sealing member may be provided with a gripping tab, a pull ring, or other means for facilitating removal of the inner sealing member. Furthermore, a tear strip member may be arranged in the inner sealing member. A tear strip member may be formed by partial cutting of an upper layer of the inner sealing member.

The inner sealing members as disclosed herein are preferably gastight. A gastight inner sealing member may be manufactured from any material or material combination suitable for providing gastight sealing of a compartment delimited by the inner sealing member, such as aluminium foil, silicon-coated paper, plastic film, paperboard, or laminates thereof. The preferred inner sealing members as disclosed herein comprise or consist of a laminate of at least one aluminium foil layer and at least one thermoplastic film layer and may be referred to as being "transport seals". The sealing members may comprise additional components such as gas valves, gripping devices, etc.

The inner sealing member is arranged to be fully or partly removed by breaking a peelable weld seal between the inner sealing member and the inner surface of the container wall, or by tearing or otherwise breaking the inner sealing member itself. Tearable inner sealing members may be provided with one or more predefined weakenings, such as perforations or a cut partly through the membrane. In a tearable multi-layer sealing member, cuts and perforations are commonly arranged in a top layer of the sealing member, which top layer is exposed to a user when opening or removing a lid from the container opening.

An inner sealing member as disclosed herein may have the general construction as set out in PCT/SE2017/050753, comprising a top layer and a bottom layer wherein the top layer is joined to the bottom layer at least in a border seal arranged along a top layer peripheral edge and a bottom layer peripheral edge. The inner sealing member comprises a tear-away area, which is delimited by a contour line arranged in the top layer. A tear strip member is arranged in the top layer and forms part of the tear-away area. The tear-strip member comprises a pull-tab which is arranged at a grip end of the tear strip. The tear-strip member is formed by a cut line which is arranged in the top layer.

The inner sealing member as disclosed herein may have any shape adapted to a corresponding cross-section of a packaging container body, including circular, oval, rectangular and modified rectangular shapes, i.e. generally rectangular shapes with rounded corner portions.

A gastight inner sealing member is particularly advantageous when the bulk solids stored in the packaging container are sensitive to air and/or moisture and it is desirable to avoid contact of the packaged bulk solids with ambient air. It may also be desirable to keep fragrances and aromas in the packaging container and prevent the packaged contents from taking up scents and flavours from the ambient air. It is also desirable that the weld between the inner sealing member and the inner surface of the container wall has a high level of tightness, and preferably is gastight. Likewise, it is desirable that the weld between the bottom disc and the inner surface of the container wall has a high level of tightness.

A weld seal with a high level of tightness and reliability may be produced if the amount of thermoplastic material in the weld seal is sufficient to create a seal and to fill out any creases or other irregularities in the welded material. It is a particular concern to supply a sufficient amount of thermoplastic material when creating the weld seal at the bottom disc, as the corner portions of the bottom disc tend to form multiple deep wrinkles in the rigid and relatively thick bottom disc material. In order to ascertain that the seal is sufficiently tight in the corner portions, it has been common practice to use relatively thick layers of weldable thermoplastic material on the inner surface of the container wall as well as on the bottom disc. The thermoplastic layers have conventionally had a basis weight in the order of 130-140 $g/m^2$ on the base disc and 70-80 $g/m^2$ on the body sheet material. As disclosed herein, it has now been found that a weld seal having a required tightness and reliability may be obtained with a much thinner thermoplastic welding layer on the inner surface of the container wall, having a basis weight which is as low as 12 g/m$^2$, as long as the combined basis weights of the thermoplastic welding layer of the body material and the thermoplastic welding layer of the base disc is 50 g/m$^2$ or more, such as 80 g/m$^2$ or more. A reduction of the basis weight of the thermoplastic welding layer of the body material has a greater impact on the overall saving of plastic material than a reduction of the basis weight of the thermoplastic welding layer of the base disc, as a much larger amount of body wall material is used for production of the container body.

The barrier properties of the packaging containers disclosed herein may be designed to meet different requirements of tightness depending on the goods which is packaged in the packaging container. By way of example, in a packaging container for dried peas a lower barrier level may be sufficient than in a packaging container for e.g. infant formula which is highly sensitive to oxygen and moisture exposure.

In the packaging containers as disclosed herein, the thermoplastic polymeric welding layer of the laminate base sheet material may have a basis weight of from 38 g/m$^2$ to 140 g/m$^2$, such as from 50 g/m$^2$ to 135 g/m$^2$, such as from 60 g/m$^2$ to 130 g/m$^2$, such as from 70 g/m$^2$ to 125 g/m$^2$, such as from 80 g/m$^2$ to 120 g/m$^2$.

In the packaging containers as disclosed herein, the laminate body sheet material may comprise a polymeric layer being arranged on a surface of the carton layer facing away from the interior of the container body, i.e. on the surface constituting the outer surface of the container body. The polymeric layer may be a coating applied to the container body material, or a film that has been separately produced and applied to the container body material. Furthermore, the outer surface of the container body may be provided with print and/or embossings.

Correspondingly, the laminate base sheet material may comprise a polymeric layer being arranged at a surface of the carton layer facing away from the interior of the container body and may be printed and/or embossed.

One or both of the body sheet material and the base sheet material may comprise one or more features such as embossings, scorings, print, pigmented coating, etc., as known in the art.

In the packaging containers as disclosed herein, a plastic reinforcing rim may be attached to the container body at one or both of the bottom end and the top end of the container body.

In the packaging container as disclosed herein, the corner portions may be curved corner portions the curved corner portions having a radius of curvature of 5-60 mm, preferably 10-40 mm, more preferably 15-30 mm.

In the packaging container as disclosed herein, one or more of the wall portions may be a curved wall portion having a radius of curvature of 200-700 mm, preferably 300-600 mm, more preferably 400-500 mm.

The packaging container as disclosed herein may have any suitable cross-section, such as polygonal, oval, circular, etc. For reasons of space saving and stack stability during shipping and storage, the packaging container as disclosed herein may have a modified rectangular cross-section, with curved corner portions connecting straight or slightly curved wall portions having a radius of curvature of 400-700 mm.

In disposable paperboard containers, there is a strong conflict between minimizing the amount of paperboard material used in the containers and making the containers sufficiently rigid to avoid that the containers are damaged or that they collapse, e.g. when stacked during transport and storage. It has been found that by imparting a slight curvature to the wall portions, shape stability and rigidity of the packaging container may be considerably improved as compared to conventional packaging containers with planar wall portions. In particular, the crush resistance of the packaging container in the height direction may be improved. Consequently, paperboard packaging containers having adequate rigidity and crush-resistance may be made using thinner paperboard sheets than in a paperboard packaging container having planar wall portions.

The packaging containers as disclosed herein are referred to as being paperboard packaging containers wherein at least the container body is formed from a sheet material consisting predominantly of fibrous cellulosic material. The paperboard material is provided in the form of a rectangular sheet which is bent into a tubular shape, whereafter the tube is closed by joining overlapping or abutting side edges of the blank to form a body tube. The join between the side edges may be formed using a sealing strip which is applied on the inside of the body tube. Joining of the material edges may be made by any suitable method such as by adhesive or welding, with welding, such as high frequency induction welding generally being preferred.

DEFINITIONS

As set out herein, the sheet materials used in the container body and the base disc material are predominantly made from cellulose fibres or paper fibres forming a carton layer in the paperboard material. The carton layer may be a single ply or multi ply material. The sheet materials are laminates which in addition to the carton layer comprise at least one thermoplastic polymeric layer in the form of a film or a coating and optionally a metal foil layer, preferably an aluminum layer. When present, the metal foil layer is covered by the at least one polymeric layer and is arranged at a surface of the carton layer material which will form an inner surface of the packaging container, i.e. at a surface which will be facing the interior of the packaging container. In addition to inner layers of polymer and metal foil, the sheet material may be coated, printed, scored, embossed, etc. and may comprise fillers, pigments, binders and other additives as known in the art. The sheet materials as disclosed herein may be referred to as paperboard, cardboard or carton materials.

The base disc is attached to the inner surface of the container body by welding. The base disc may be attached inset from the body bottom edge to accommodate a lower reinforcing rim attached to the inner surface of the container body. The base disc is shaped before or during insertion at the bottom end of the container body by bending a peripheral edge portion out of the plane of the bottom disc to create a flange which is aligned with the inner surface of the tubular container body wall and which is welded to the inner surface of the container body. The weld seal between the container body and the bottom disc may be formed by any suitable method such as by high frequency induction welding, heat welding and ultrasonic welding. In order to achieve a tight seal, the weld seal is preferably a continuous seal extending around the circumference of the container body to produce a moisture proof and preferably gas-tight seal. In the composite cans produced according to the method as disclosed herein, high frequency induction welding is a preferred method for attaching any components such as a body sealing strip, top and bottom rims, the base disc and a fully or partly removable inner sealing member. Using high frequency induction welding requires that at least one of the welded components comprises a metal foil layer, such as an aluminium layer. The base disc may comprise a metal foil layer being arranged between the carton layer and the thermoplastic welding layer. The laminate body sheet material may comprise a metal foil layer being arranged between the carton layer and the thermoplastic welding layer. If only one of the components comprises a metal foil layer, it is generally the base disc.

A high frequency induction welding process provides a highly controlled way of creating a join with a predetermined level of tightness between two components of the packaging container as disclosed herein. The join is made by supplying energy to heat and locally soften or melt thermoplastic material on contacting surfaces of the components. By controlling the supplied amount of energy, the applied pressure, and the weld time, it is possible to adapt the welding process to the welded materials and to obtain a weld seam with a required level of tightness and reliability.

When welding the inner thermoplastic welding layers of the body sheet material and the base sheet material to each other the thermoplastic polymeric material in these layers are caused to soften or melt and to fuse together, forming a coherent seal between the base disc and the container wall. The sheet material which is used for the base disc is generally thicker, stiffer and more compressible than the material of an inner sealing member and forms deeper creases at the corner portions of the container body. For this reason, it is necessary to supply more thermoplastic material in the welding layer of a base disc so that the creases can be filled out by molten thermoplastic material and create a high quality seal also at the corner portions.

As used herein, the term "bulk solids" refers to a non-liquid bulk material from which a desired amount of the product may be poured, scooped or taken by hand out of a packaging container. The bulk material may be dry or moist. The bulk solids which are suitable for packing in the paperboard packaging containers as disclosed herein include any material in the form of particles, granules, grinds, plant fragments, short fibres, flakes, seeds, pieces, etc.

The paperboard packaging container as disclosed herein may be a container for alimentary products such as infant formula, coffee, tea, rice, flour, sugar, cereals, soup powder, custard powder, pasta, snacks, or the like. Alternatively, the bulk solids may be non-alimentary, such as tobacco, detergent, fertilizer, chemicals or the like.

BRIEF DESCRIPTION OF THE DRAWINGS

The present invention will be further explained hereinafter by means of non-limiting examples and with reference to the appended drawings wherein.

DETAILED DESCRIPTION OF PREFERRED EMBODIMENTS

It is to be understood that the drawings are schematic and that individual components, such as layers of material are not necessarily drawn to scale. The packaging container shown in the figures is provided as an example only and should not be considered limiting to the invention as disclosed herein.

Figure 1:
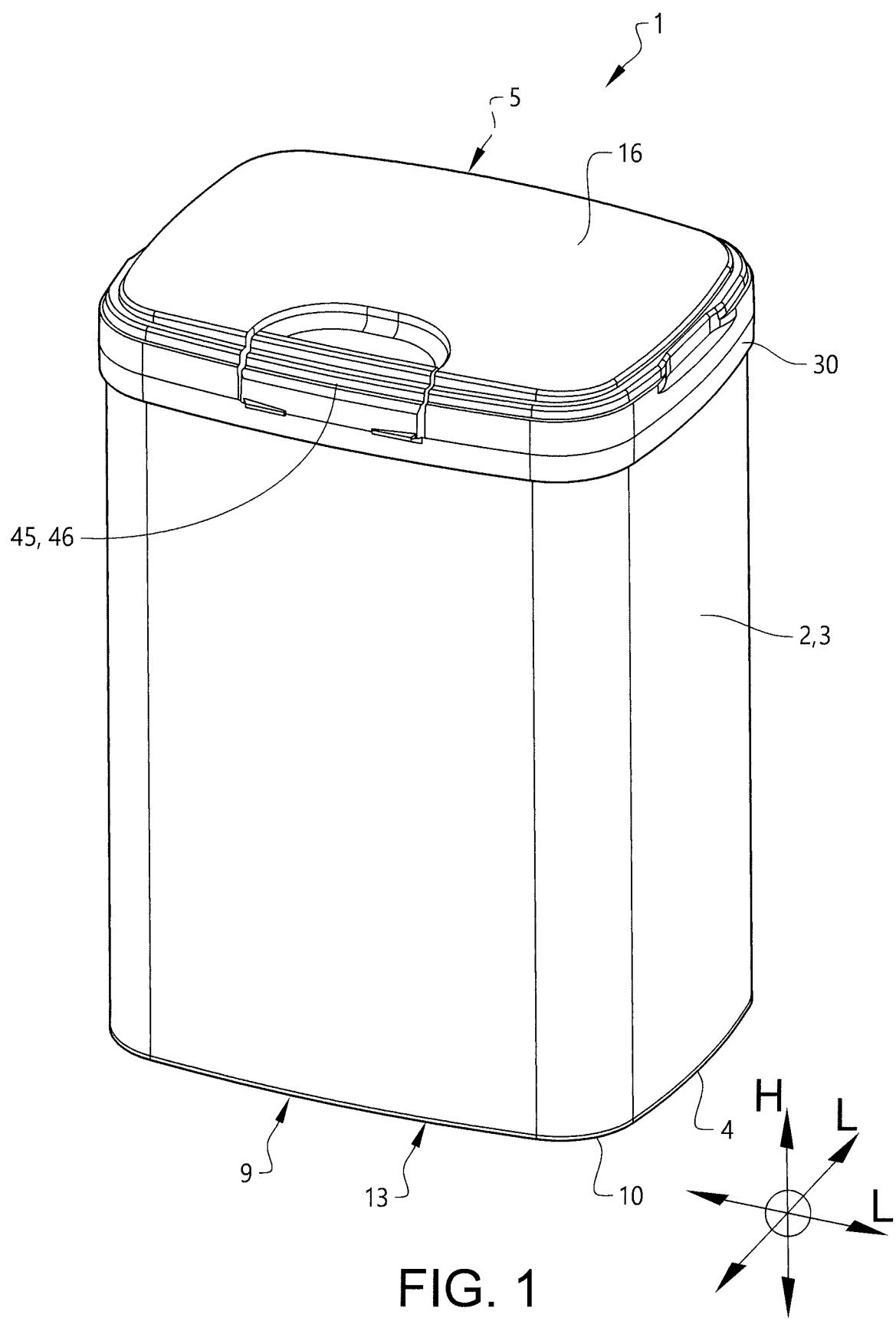
FIG. 1 shows a first packaging container.
Figure 2:
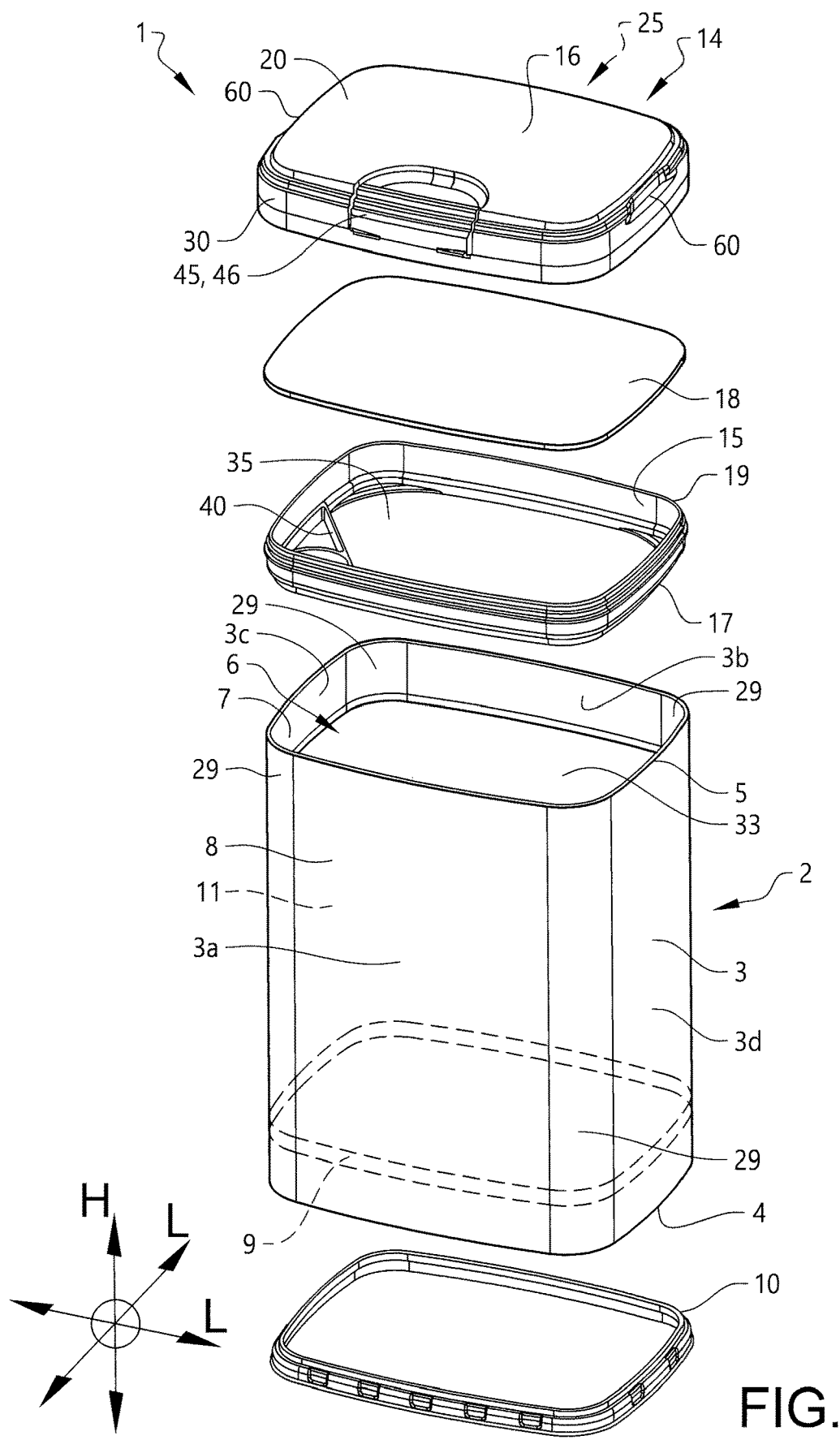
FIG. 2 shows an exploded view of the packaging container in FIG. 1.

With reference to FIGS. 1 and 2 there is shown a paperboard packaging container 1 for bulk solids. The particular shape of the container 1 shown in the figures should not be considered limiting to the invention. Accordingly, the paperboard packaging container according to the invention may have any useful shape or size.

The packaging container 1 comprises a container body 2 formed by a tubular container wall 3 including a front wall portion 3a, a rear wall portion 3b and two side wall portions 3c, 3d which are connected by curved corner portions 29. The container wall 3 extends from a bottom end 4 to a top end 5 at a container body opening 6 in a height direction H of the packaging container 1, perpendicular to a lateral direction L of the packaging container 1. The container wall 3 has an inner surface 7 facing towards an inner compartment 11 in the packaging container 1 and an outer surface 8 facing away from the inner compartment 11 and being exposed to the exterior of the packaging container 1.

Figure 3:
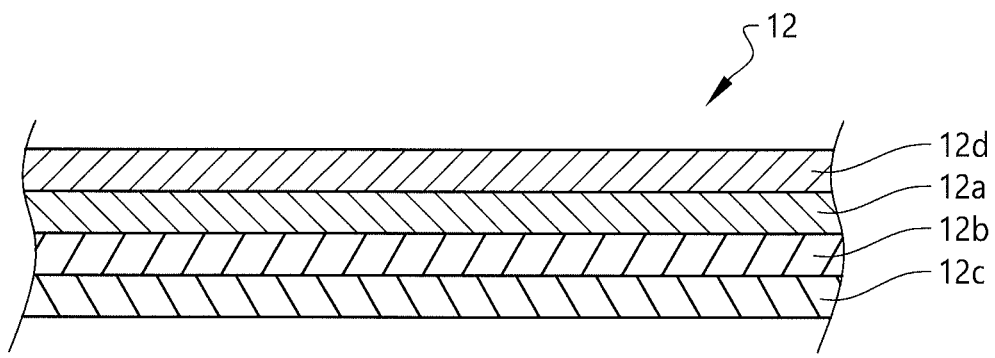
FIG. 3 shows a cross-section through a laminate body sheet material.

The container body 2 comprises a laminate body sheet material 12, as shown in FIG. 3, the laminate body sheet material 12 comprising a carton layer 12a, a metallic foil layer 12b and an inner thermoplastic polymeric layer 12c being arranged on a surface of the carton layer which is arranged to be facing towards the inner compartment 11 of the container body 2. The metallic foil layer 12b is arranged between the carton layer 12a and the inner thermoplastic polymeric layer 12c. The metallic foil layer 12b is optional to the container as disclosed herein. The inner thermoplastic polymeric layer 12c forms the inner surface 7 of the inner compartment 11. In the illustrated example in FIG. 3, an outer polymeric layer 12d is arranged on the surface of the carton layer 12a which is arranged to be facing away from the inner compartment 11 and which forms the outer surface 8 of the container wall 3. The outer polymeric layer 12d is an optional feature of the container wall 3.

The container body 2 may be formed by bringing together the side edges of the laminate body sheet material 12 causing the material to assume a tubular shape, and sealing the side edges together. Sealing of the side edges may be made by any suitable method as known in the art, such as by welding or gluing, with welding being preferred. Sealing of the side edges of the container body web may involve using a sealing strip, as known in the art. The container body may be formed into any desired tubular shape including circular, oval, polygonal, including rectangular and modified rectangular shapes, such as the modified rectangular shape with rounded corners which is shown in the figures.

Figure 4:
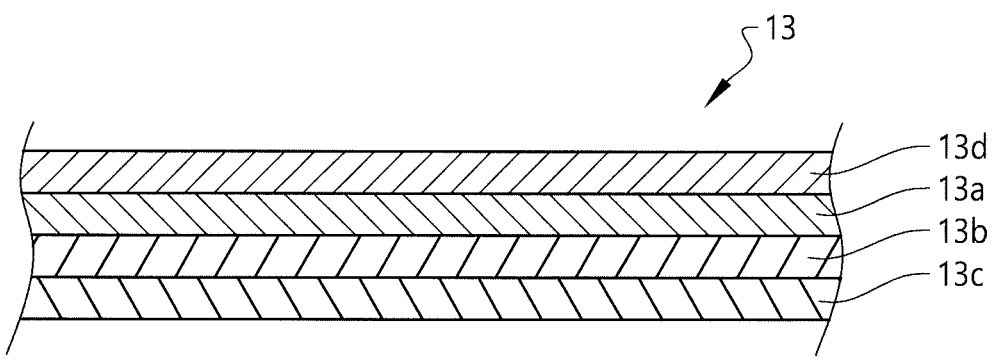
FIG. 4 shows a cross-section through a laminate base sheet material.

A base disc 9 is attached at the bottom end 4 of the container body 2. The base disc 9 comprises a laminate base sheet material 13, as shown in FIG. 4. The base sheet material 13 comprises a carton layer 13a, a metallic foil layer 13b and a thermoplastic polymeric layer 13c being arranged at a surface of the carton layer 13a facing towards the inner compartment 11 of the container body 2, with the metallic foil layer 13b being arranged between the carton layer 13a and the thermoplastic polymeric layer 13c. The metallic foil layer 13b is optional to the container as disclosed herein. In the illustrated example in FIG. 4, an outer polymeric layer 13d is arranged on the surface of the carton layer 13a which is arranged to be facing away from the inner compartment 11 and which forms an outer surface of the base disc 9. The outer polymeric layer 13d is an optional feature of the base disc 9.

The base disc 9 is attached to the container wall 3 by folding an edge portion out of the plane of the base disc 9, bringing the folded edge portion into alignment with the inner surface 7 of the container wall 3 and welding the folded edge portion of the base disc 9 to the inner surface 7 of the container wall 3. The welding operation causes the inner thermoplastic welding layers 12c and 13c of the body sheet material and the base sheet material to soften or melt and to fuse together to form a coherent seal between the base disc 9 and the container wall 3.

The packaging container 1 is provided with a bottom rim 10 which is attached to the inner surface 7 of the container wall 3, between the base disc 9 and the bottom end 4 of the container body 2. The bottom rim 10 reinforces the bottom edge of the container body 2 and protects the container body bottom edge 4 from mechanical deformation. In addition, the bottom rim 10 provides a stabilization of the container wall 3 and contributes to maintaining a desired shape, such as a desired curvature of the container wall 3. The bottom rim 10 delimits a downwardly open space at the bottom end 4 of the container body 2, which space may be used to accommodate a part of another packaging container in a stacking configuration. The bottom rim is an optional feature of the packaging container as disclosed herein.

The packaging container 1 is provided with a closure arrangement comprising a lid 16 and an upper reinforcing rim 15 extending along the periphery of the container body opening 6.

The upper reinforcing rim 15 is preferably a plastic rim, most preferably a thermoplastic rim and is attached to the inner surface 7 of the container body wall 3 at the container body opening 6. Each of the upper and lower end edge of the container body wall 3 comprises an edge portion corresponding to a wall portion 3a, 3b, 3c, 3d. The wall portions may be planar wall portions or one or more of the wall portions 3a, 3b, 3c, 3d, and one or more corresponding portions of the upper reinforcing rim 15 may have an outwardly curved shape with a radius of curvature of 200-700 mm, preferably 300-600 mm, more preferably 400-500 mm.

As set out herein, the wall portions 3a, 3b, 3c, 3d are connected by curved corner portions 29 which may have a radius of curvature of 5-60 mm, preferably 10-40 mm, more preferably 15-30 mm.

As a consequence of one or more container wall portion 3a, 3b, 3c, 3d, being conformed to an outwardly curved portion of the upper reinforcing rim 15 and optionally to a corresponding outwardly curved portion of a bottom rim, the container wall portion 3a, 3b, 3c, 3d, may be provided with an outwardly bulging shape with a stable and controlled outwardly convex curvature.

The provision of at least an upper reinforcing rim, ascertains that the wall portions retain a selected shape such as an outward curvature which may prevent the wall portions from bulging inwards. Inwardly bulging wall portions is a phenomenon known to occur in paperboard packaging containers and presents a problem in that it may negatively affect the stability and crush resistance of the packaging container.

The reinforcing rim is an optional component of the paperboard containers as disclosed herein.

In paperboard containers, there is a conflict between minimizing the amount of packaging material which is used in the containers and making the containers sufficiently rigid to avoid that the containers are damaged or that they collapse, e.g. when stacked during transport and storage. It has been found that by making one or more container walls only slightly outwardly curved, shape stability and rigidity of the packaging container may be considerably improved as compared to conventional packaging containers having planar walls. Consequently, paperboard packaging containers having adequate rigidity and crush-resistance may be made using thinner cardboard layers than in a paperboard packaging container having planar side walls.

The radii of curvature of the container walls may be selected such that the container walls are provided with a near-planar shape, implying that the container walls are perceived by a consumer as being planar. Further, it has been found that even by providing the container walls with a very slight outwardly directed curvature, such that the container walls are near-planar, stackability of the packaging container may be improved as the crush resistance in the height direction of the container is increased. A slight outward curvature which deviates minimally from a planar shape also provides the packaging container with a three-dimensional shape allowing space efficient transport and storage.

The upper reinforcing rim 15 has an extension in the height direction, H, of the container 1 and has a lower rim edge 17 facing towards the container bottom 9 and an upper rim edge 19 facing away from the container bottom 9.

The upper reinforcing rim 15 is joined to the inner surface 7 of the container wall 3 e.g. by means of a weld seal extending around the container opening 6. The weld seal preferably extends continuously around the container body opening 5 to provide a seal between the upper reinforcing rim 15 and the container wall 3. The seal is preferably sift-proof, more preferably moisture proof and most preferably gas-tight.

The lid 16 comprises an outer lid part 20 which is part of a lid component 14 and an inner lid part 18. The outer lid part 20 is a profiled part with a three-dimensional shape providing an upper outer surface 23 of the lid 16. The inner lid part 18 is a planar disc, as shown in FIG. 2. The inner lid part 18 is applied to the inner surface of the outer lid part 20 and is arranged to seal against the upper rim edge 19 of the upper reinforcing rim 15 when the lid 16 is in the closed position, as shown in FIG. 1.

The outer lid part 20 is connected by a hinge 25 to a connecting part 30. The hinge 25 may comprise or consist of a live hinge, formed integrally with the upper lid part 20 and the connecting part 30 as one or more flexible connections between the upper lid part 20 and the connecting part 30. As set out herein a live hinge is only one example of a useful hinge and it should be understood that any other type of functional hinge may be used for creating a hinged connection between the connecting part and the lid. Moreover, the lid may be of the removable kind, without any permanent connection to the connecting part 30.

The connecting part 30 is mechanically attached to the upper reinforcing rim 15 by a snap-on connection.

The inner compartment 11 of the packaging container is sealed with a fully or partly removable sealing member 33 which constitutes a transport seal over packaged bulk solids and which is sealed to the inner surface of container body wall 3 by being welded thereto. The removable sealing member 33 may be attached to the container body wall 3 either from the top end 5 of the container body 2 or from the bottom end 4 of the container body 2. In order to gain a first access to the packaged bulk solids, a user opens the lid 16 and exposes the packaged bulk solids by fully or partly removing the sealing member 33.

Figure 5:
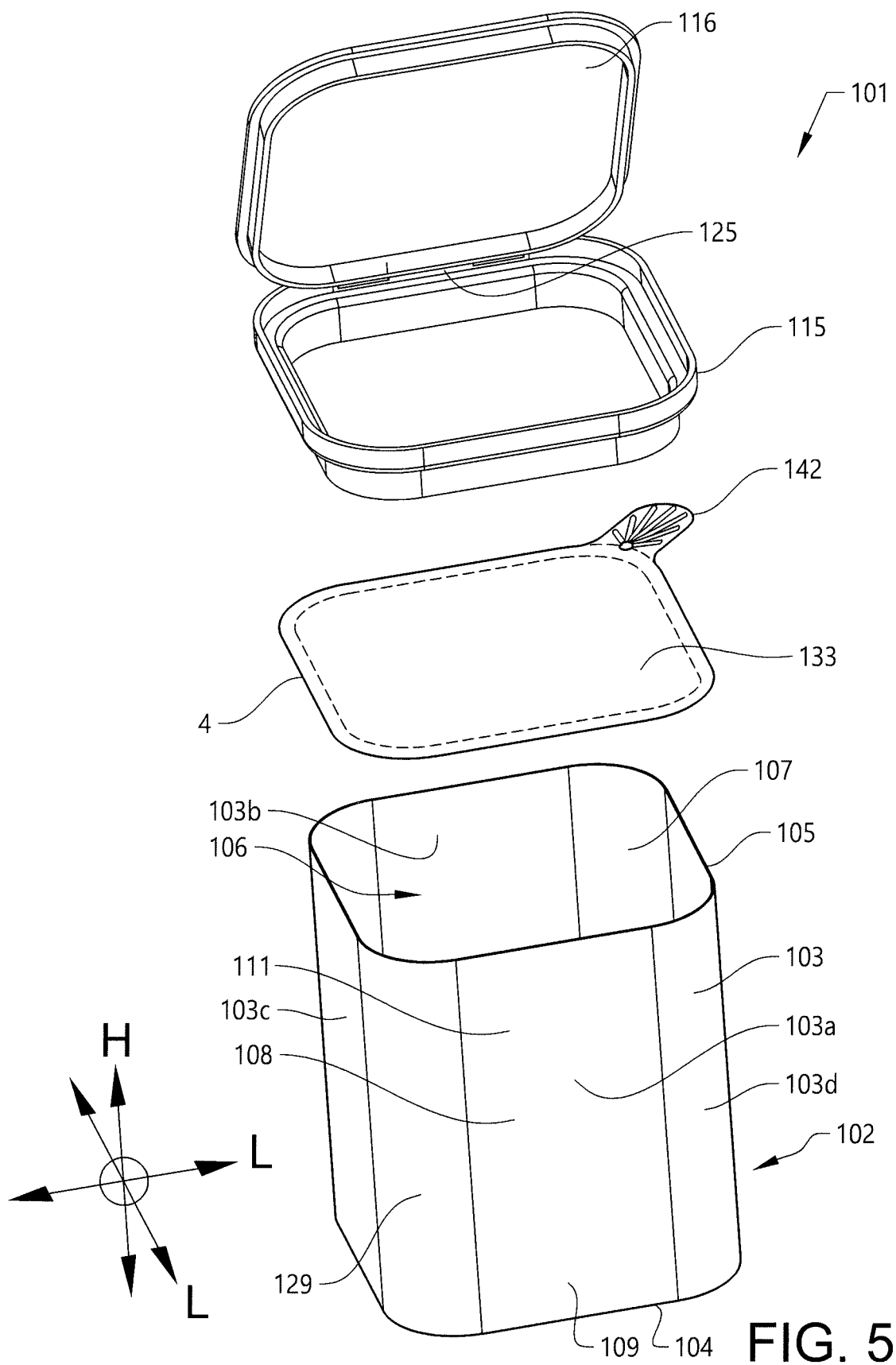
FIG. 5 shows an exploded view of a second packaging container.
Figure 6:
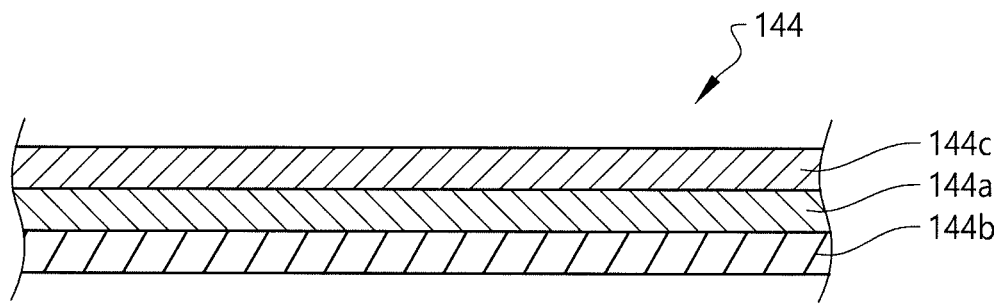
FIG. 6 shows a cross-section through a first laminate sealing member sheet material.

The sealing member 33 may be arranged to be peeled away from the inner surface 7 of the container wall 3 as in the packaging container 101 shown in FIG. 5 or may be arranged with means for breaking the sealing member 33 so that it can be at least partly torn away as in the packaging container 201 shown in FIG. 6. Such means may be in the form of one or more predefined weakenings, such as perforations or a cut partly through the sealing member. When the sealing member is of the tear-open type, a narrow edge part of the sealing member may remain at the inner surface 7 of the container wall 3 after removal of the sealing member 33.

With reference to FIG. 5 there is shown an exploded view of a packaging container 101 comprising a container body 102 having a tubular container wall 103 including a front wall portion 103*a*, a rear wall portion 103*b* and two side wall portions 103*c*, 103*d* which are connected by curved corner portions 129. The container wall 103 extends from a bottom end 104 to a top end 105 at a container body opening 106 in a height direction H of the packaging container 101, perpendicular to a lateral direction L of the packaging container 101. The container wall 103 has an inner surface 107 facing towards an inner compartment 111 in the packaging container 101 and an outer surface 108 facing away from the inner compartment 111 and being exposed to the exterior of the packaging container 101. The container body 102 comprises a laminate body sheet material as disclosed herein.

A base disc 109 is attached at the bottom end 104 of the container body 102. The base disc 109 comprises a laminate base sheet material as disclosed herein. The packaging container 101 which is shown in FIG. 5 does not have a bottom reinforcing rim. The bottom end 104 of the container body 102 may optionally be provided with a reinforcement such as a bottom rim or a curled bottom edge, as known in the art.

The packaging container 101 is provided with a closure arrangement comprising a lid 116 and an upper reinforcing rim 115 extending along the periphery of the container body opening 106.

The upper reinforcing rim 115 is preferably a plastic rim, most preferably a thermoplastic rim and is attached to the upper edge of the container body wall 103 at the container body opening 106 by welding or gluing. The lid 116 is connected to the upper reinforcing rim 115 by means of a hinge 125. No locking arrangement is provided for locking the lid 116 in a closed position on the upper reinforcing rim 115 although such locking arrangement may be provided, as disclosed herein.

The inner compartment 111 of the packaging container 101 in FIG. 5 is sealed with a fully removable sealing member 133 which is sealed to the inner surface 107 of the container body wall 103 by being welded thereto and which is provided with a pull tab 142. In the illustrated example, the pull tab 142 is formed integrally with the sealing member 133 and is placed at a corner portion of the sealing member 133. Alternatively, the pull tab may be formed from a separate piece of material which is attached to the sealing member 133 and/or may be placed at a different location, such as at the top of the sealing member or at a side edge of the sealing member. The removable sealing member 133 may be attached to the container body wall 103 either from the top end 105 of the container body 102, as indicated in FIG. 5 or from the bottom end 104 of the container body 102. In order to gain a first access to the packaged bulk solids, a user opens the lid 116 and exposes the packaged bulk solids in the inner compartment 111 by gripping the pull tab 142 and removing the sealing member 133 by peeling open the seal between the sealing member 133 and the inner surface 107 of the container body wall 103.

With reference to FIG. 6, the peelable sealing member 133 in the FIG. 5 packaging container 101 comprises a laminate sealing member sheet material 144, as shown in FIG. 6. The sealing sheet material 144 comprises a structural layer 144*a*, which may be a paper layer but which preferably is a metallic foil layer, and a thermoplastic welding layer 144*b* being arranged at a first surface of the structural layer 144*a*. The first surface of the structural layer 144*a* is the surface which is facing the inner surface of the container wall in the weld between the inner surface of the container wall 103 and the sealing member 144. In the example shown in FIG. 5, the thermoplastic welding layer 144*b* is facing towards the inner compartment 111 of the container body 102. If applying the sealing member 133 from the bottom end 104 of the container body 102, the thermoplastic welding layer 144*b* will instead be facing away from the inner compartment 111 of the container body 102.

The sealing sheet material 144 in FIG. 6 further comprises an optional thermoplastic layer 144*c* which is arranged on a second surface of the structural layer 144*a* opposite the first surface.

As set out herein, when the structural layer 144*a* is a metallic foil layer, the metallic foil layer of the laminate sealing sheet material 144 has a thickness of from 9 micrometer to 45 micrometer, such as from 11 micrometer to 30 micrometer, such as from 12 micrometer to 16 micrometer.

Figure 7:
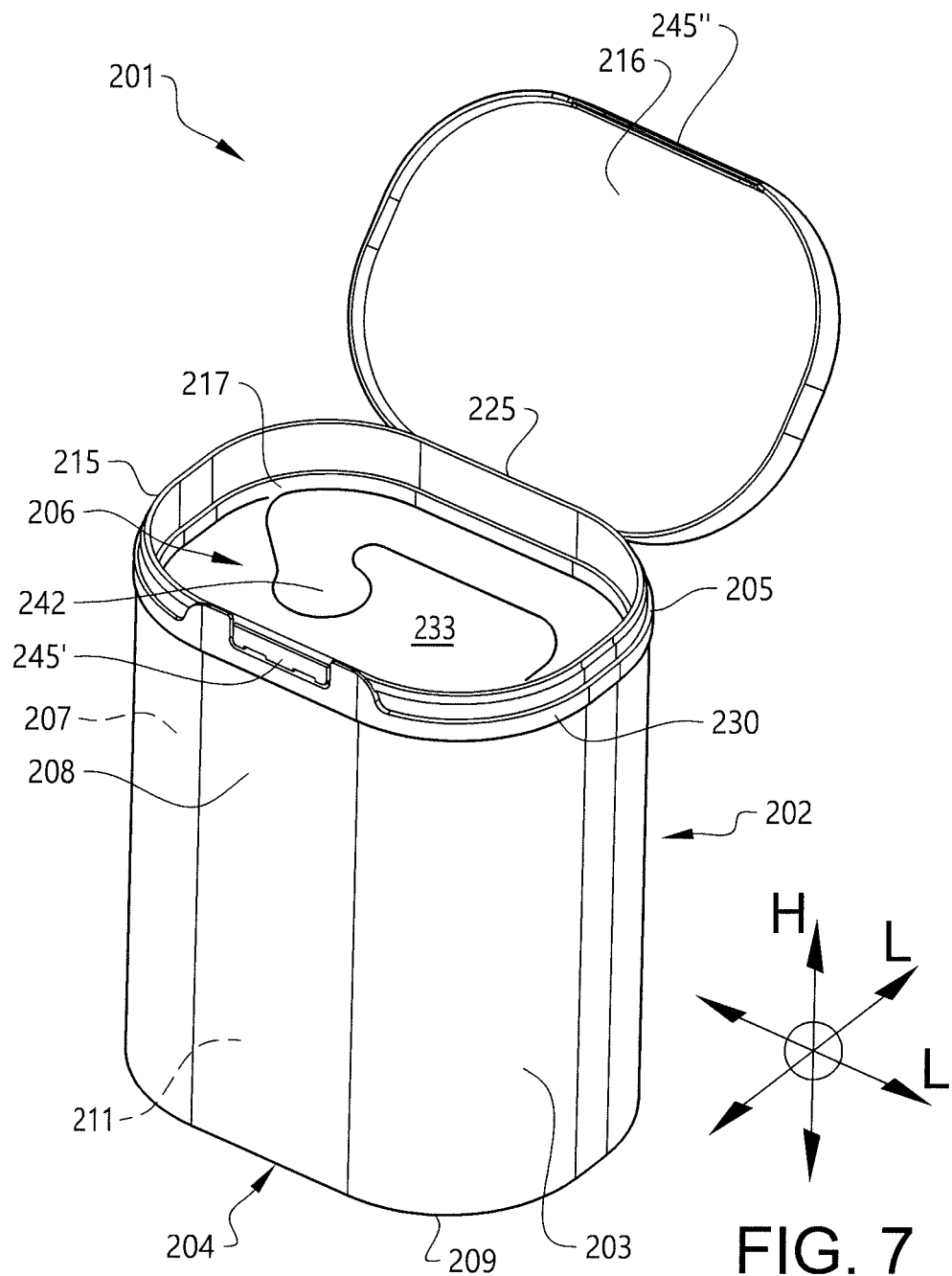
FIG. 7 shows a third packaging container.

With reference to FIG. 7 there is shown a further example of a packaging container 201 comprising a container body 202 having a tubular container wall 203. The container wall 203 extends from a bottom end 204 to a top end 205 at a container body opening 206 in a height direction H of the packaging container 201, perpendicular to a lateral direction L of the packaging container 201. The container wall 203 has an inner surface 207 facing towards an inner compartment 211 in the packaging container 201 and an outer surface 208 facing away from the inner compartment 211 and being exposed to the exterior of the packaging container 201. The container body 202 comprises a laminate body sheet material as disclosed herein.

A base disc 209 is attached at the bottom end 204 of the container body 202. The base disc 209 comprises a laminate base sheet material as disclosed herein. The bottom end 204 of the container body 202 may optionally be provided with a reinforcement such as a bottom rim or a curled bottom edge, as is known in the art.

The packaging container 102 is provided with a closure arrangement of the same type as in the packaging container 1 shown in FIGS. 1 and 2, comprising a two-part lid 216 and an upper reinforcing rim 215 extending along the periphery of the container body opening 206.

The upper reinforcing rim 215 is preferably a plastic rim, most preferably a thermoplastic rim and is attached to the upper edge of the container body wall 203 at the container body opening 106 being welded to the inner surface 207 of the container wall 203. The lid 216 is connected by a hinge 225 to a connecting part 230 which is mechanically attached to the upper reinforcing rim 215.

The inner compartment 211 of the packaging container 201 in FIG. 7 is sealed with a partly removable tear-open sealing member 233 which is sealed to the inner surface 207 of the container body wall 203 by being welded thereto and which is provided with a pull tab 242. The pull tab 242 is formed integrally with the sealing member 233 by being cut-out in an upper layer of the sealing member 233. A sealing border 217 of the sealing member 233 is attached to the container wall 203 by welding. The sealing member 233 may be attached to the container wall 203 either from the top end 205 of the container body 202 or from the bottom end 205 of the container body 202, in which case it is attached before attaching the bottom disc 209. In the example shown in FIG. 7, the sealing member 233 has been applied from the top end 205 of the container body 202, with the edge portion 217 of the sealing member 233 which is attached to the container wall 203 being upwardly directed.

In order to gain a first access to the packaged bulk solids, a user opens the lid 216 and exposes the packaged bulk solids in the inner compartment 211 by gripping the pull tab 242 and removing the sealing member 233 by tearing it open along a tear indication made in the sealing member 233 close to the inner surface 207 of the container body wall 203.

Figure 8:
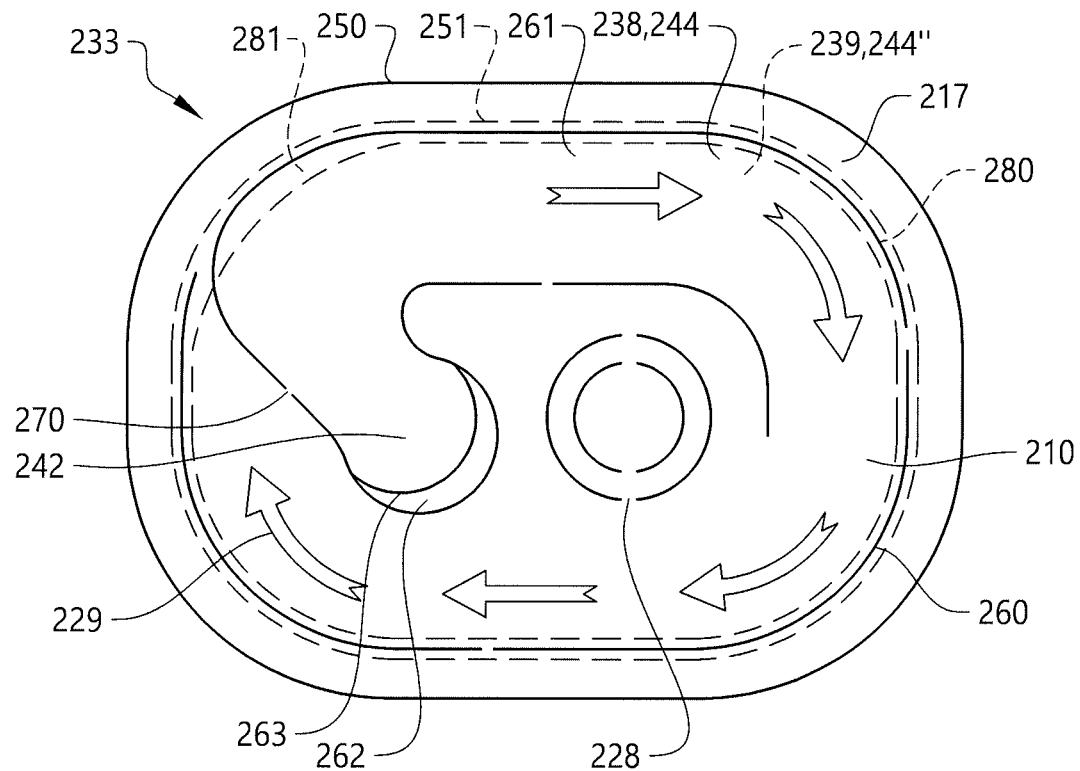
FIG. 8 shows a plan view of a sealing member.

With reference to FIG. 8, the tear-open sealing member 233 in the FIG. 7 packaging container 101 comprises a top member 238 formed from a top member sheet material 244' and a bottom member 239 formed from a bottom member sheet material 244". The top member 238 has a top member peripheral edge 250 and the bottom member 239 has a bottom member peripheral edge 251. In FIG. 8, the top member 238 is shown to be larger than the bottom member 239 with the top member peripheral edge 250 being arranged laterally outboard of the bottom member peripheral edge 251. Alternatively, the top member 238 and the bottom member 239 may have the same size and shape, or the bottom member 239 may be larger than the top member 238 with the bottom member peripheral edge 251 arranged laterally outboard of the top member peripheral edge 250. The edge portion of the top member 238 which extends outward of the peripheral edge 251 of the bottom member 239 provides the sealing member 233 with a thinner more flexible sealing border 217 for sealing the sealing member 233 to the inner surface 207 of the container wall 203.

The top member 238 is joined to the bottom member 239 in a border seal 280 arranged along the peripheral edges 250, 251 of the top and bottom members 238, 239. The border seal 280 is preferably a continuous seal such as a continuous weld seal which extends around the full periphery of the sealing member 233. The thinner sealing border 217 which is constituted only by the top member 238 forms a peripheral portion of the sealing member 233 which is arranged outward of the border seal 280 and the peripheral edge 251 of the bottom member 239 and which surrounds the border seal 280.

The sealing member 233 comprises a tear-away area 210 which is delimited by a contour line 260 arranged in the top member 238. A tear strip 261 is arranged in the top member 238 and forms part of the tear-away area 210. The tear-strip 261 comprises a pull-tab 242 which is arranged at a grip end of the tear strip 261. The outer portion of the pull-tab 242 is separable from the bottom member 239 of the sealing member 233. The sealing member 233 in FIG. 8 is shown with a cut-out portion 262 being removed from the top member 238 in order to expose the end edge 263 of the pull-tab 262 and facilitate lifting the pull-tab 242 away from the bottom member 239. The cut-out portion 262 is an optional feature of the sealing member 233 as disclosed herein.

In addition to the border seal 280, the top member 238 and the bottom member 239 of the sealing member 233 are further joined to each other in a tear strip attachment area 281 arranged at an inner portion of the pull-tab 242. The additional tear strip attachment area 281 is shown as a broadened portion of the border seal 280 and may aid in initiating proper tearing of the bottom member 239 when pulling away the tear-away area 210. The additional tear strip attachment area 281 is an optional feature of the sealing member 233 as disclosed herein and may be omitted. Furthermore, the tear strip attachment area 281 may have any useful size or shape. By way of example only, the tear strip attachment area may extend across a larger portion of the width of the tear strip such as over the full width of the tear strip and/or may extend further along the tear strip, etc.

One or more cuts 270 are provided in the top member 238 which cuts delimit the pull tab 242, the tear-strip 261 and the tear-away area 210. The one or more cuts 270 in the top member 238 constitute tear indication for ascertaining proper and controlled tearing of the material in the bottom member 239.

The top member 238 and the bottom member 239 may comprise attachments 228, 229 in addition to the border seal 280 and a tear strip attachment area 281. Such additional attachments are illustrated in FIG. 8 by a circular attachment area 228 arranged generally centrally on the tear-away area 210, and by discrete attachments 229 in the form of arrows which at the same time serve as indicators of a proper tear direction. Any suitable number of additional attachments may be applied between the top member 238 and the bottom member 239 and the attachments may have any suitable size, shape and distribution.

Bonding of the top member to the bottom member is preferably made by heat sealing, although adhesive attachments may be used as an alternative or as a complement. The top member and the bottom member are laminates comprising a thermoplastic weldable layer and a structural layer, such as a metallic foil layer, paper, etc.

The attachments between the top member and the bottom member are permanent attachments, implying that the material in the layers will break before an attachment is broken when pulling at the tear strip.

Figure 9:
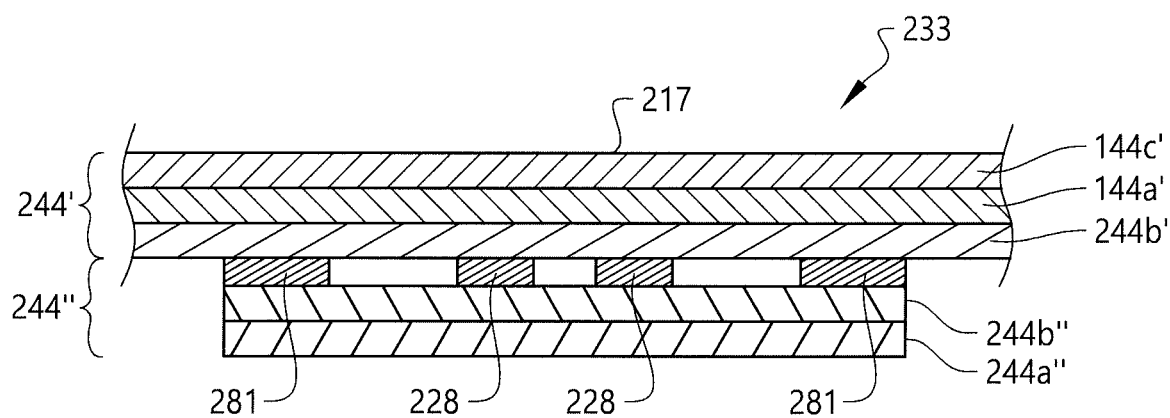
FIG. 9 shows a cross-section through a second laminate sealing member sheet material.

FIG. 9 shows a cross-section through a sealing member 233 of the type shown in FIG. 8. The sealing member 233 comprises a laminate top member sheet material 244' and a laminate bottom member sheet material 244". Each of the top and bottom member sheet materials 244', 244" comprises a structural layer 244a', 244a" such as a metallic foil layer and a first thermoplastic welding layer 244b', 244b". The first thermoplastic welding layers 244b', 244b" are arranged on the surfaces of the top and bottom member sheet materials 244', 244" which are facing each other and are welded together in a border seal 280 and in an additional central attachment area 228. The top member sheet material 244' further comprises an optional second thermoplastic layer 244c' which is arranged on the surface of the structural layer 244a'. Although not shown in FIG. 9, the laminate bottom member sheet material 244" may comprise a second thermoplastic layer on the surface of the structural layer 244" which is facing away from the top member sheet material 244'.

An edge portion of the top member sheet material 244' extends laterally outward of the bottom member sheet material 244" and forms a sealing border 217. The sealing border 217 formed by the exposed part of the first thermoplastic welding layer 244b' of the laminate top member sheet material 244' is used for welding the sealing member 233 to the inner surface 207 of the container wall 203.

As set out herein, when the structural layer 244a', 244b" of the top member sheet material 244' and/or of the bottom member sheet material 244″ is a metallic foil layer, the metallic foil layer has a thickness of from 5 micrometer to 10 micrometer, such as from 5.5 micrometer to 9 micrometer.

With further reference to the packaging container shown in FIGS. 1 and 2, the sealing member 33 may be of any kind as disclosed herein such as of the peelable kind shown in FIGS. 5 and 6 or the tearable kind shown in FIGS. 7, 8 and 9.

Once the sealing member 33 has been removed or torn open, it is sufficient to open the lid 16 in order to gain access to the contents in the interior compartment 11. The upper reinforcing rim 15 which is shown in FIG. 2 carries a scraper bar 40 which extends across a corner portion of the reinforcing rim 15. The scraper bar 40 may be a combined scraper bar and scoop holder comprising a scraping edge for scraping off excess scooped-up contents from a scoop or spoon and being arranged to receive and hold a fastening element and/or a scoop head of a scoop or spoon. The scraper bar 40 is an optional element of the packaging container 1 as disclosed herein.

When the packaging container 1 has been opened, a desired quantity of the contents may be removed from the interior compartment 11 either by hand, by using a scoop or a spoon, or by pouring. If a scoop or spoon is used, it may be a scoop or spoon which is provided together with the packaging container. The scoop or spoon may initially be placed on the sealing member 33, may be removably attached to the inner surface of the lid 16 or may be attached to a combined scraper bar and scoop holder 40.

The closure arrangement as shown on the packaging container 1 in FIGS. 1 and 2 with an upper reinforcing rim 15 directly attached to the inner surface 7 of the container wall 3 and a lid component 14 comprising a lid part 20 and a connecting part 30 provides a tight closure between the lid 16 and the container body 2. When the lid 16 is closed on the packaging container 1, the upper rim edge 19 abuts against the inner lid part 18 and creates a seal between the upper reinforcing rim 15 and the lid 16.

In order to keep the lid 16 secured in the closed position between dispensing occasions, the closure arrangement of the packaging container 1 may further comprise a locking arrangement 45, as seen in FIGS. 1 and 2. The locking arrangement 45 may comprise mating locking elements, e.g. a female locking element arranged on the lid 16 and a male locking element arranged on a locking flap 46 arranged on the connecting part 30. A locking arrangement 45 of this type is illustrated in the figures and is closed by moving the locking flap 46 upward and inward over the lid 16 to the position shown in FIG. 1 and is opened by moving the locking flap 46 in the opposite direction.

Another example of a locking arrangement comprising mating locking elements 245' and 245″ is illustrated in FIG. 7.

A weld seal is formed by supplying energy to heat and locally soften or melt the thermoplastic material in the weld. When welding the bottom disc 9, 109, 209 to the inner surface 7, 107, 207 of the container wall 3, 103, 203, a combined basis weight of the thermoplastic welding layer of the laminate body sheet material and the thermoplastic welding layer of the base sheet material may be from 50 g/m$^2$ to 160 g/m$^2$, such as from 70 g/m$^2$ to 150 g/m$^2$ such as from 80 g/m$^2$ to 140 g/m$^2$, or from 90 g/m$^2$ to 130 g/m$^2$.

When welding the sealing member 33, 133, 233 to the inner surface 7, 107, 207 of the container wall 3, 103, 203, a combined basis weight of the thermoplastic welding layer of the sealing member which is welded to the inner surface 7, 107, 207 of the container wall 3, 103, 203 and the thermoplastic welding layer 12c of the laminate body sheet material 12 may be from 25 g/m$^2$ to 140 g/m$^2$, such as from 30 g/m$^2$ to 135 g/m$^2$, such as from 40 g/m$^2$ to 130 g/m$^2$, such as from 70 g/m$^2$ to 125 g/m$^2$, such as from 80 g/m$^2$ to 120 g/m$^2$.

In order to create a sufficiently tight weld seal between the container wall and an attached bottom disc 9, more thermoplastic material is generally required than what is needed for obtaining a tight seal between an inner sealing member/transport seal and the container wall.

Any plastic component in the packaging container as disclosed herein may be formed from thermo-formable or moldable plastic materials, e.g. by injection molding. Injection molding is particularly suitable for producing plastic components having a three-dimensional structure, such as the lid component and the reinforcing rims disclosed herein.

It should be understood that the lid constructions shown in the figures are optional to the packaging container of the claimed invention. In particular, the lids need not be hinge-lids but may be fully removable, plug-in or snap-on lids.

The invention claimed is:

1. A packaging container comprising a container body having a bottom end and a top end, said container body comprising a tubular container wall extending in a height direction of said packaging container from said bottom end to said top end and having an inner surface facing towards an interior of said container body and an outer surface facing away from said interior of said container body, said packaging container being closed at said bottom end by a base disc which is attached by welding to said inner surface of said container body at said bottom end of said container body, said packaging container comprising a top end closure comprising an openable and reclosable lid, said container body comprising a laminate body sheet material comprising a carton layer, a metallic foil layer and a thermoplastic welding layer being arranged on said inner surface of said container body, with said metallic foil layer being arranged between said carton layer and said inner thermoplastic welding layer, said base disc comprising a laminate base sheet material comprising a carton layer and an inner thermoplastic welding layer being arranged on a surface of said base disc which is facing towards said interior of said container body, characterized in that
   said inner thermoplastic welding layer of said laminate body sheet material has a basis weight of 12 g/m$^2$ to 75 g/m$^2$ and a combined basis weight of said thermoplastic welding layer of said laminate body sheet material and said thermoplastic welding layer of said base sheet material is from 50 g/m$^2$ to 160 g/m$^2$.

2. A packaging container according to claim 1, wherein said laminate base sheet material comprises a metallic foil layer, said metallic foil layer being arranged between said carton layer and said inner thermoplastic welding layer.

3. A packaging container according to claim 2, wherein said metallic foil layer of said laminate base sheet material has a thickness of 4 micrometers to 10 micrometers.

4. A packaging container according to claim 1, wherein said base disc is attached by high frequency induction welding to said inner surface of said container body.

5. A packaging container according to claim 1, wherein said top end closure comprises a fully or partly removable inner sealing member which is attached by welding to said inner surface of said container body at a distance from said top end of said container body, said inner sealing member comprising a first laminate sealing member sheet material comprising a structural layer and a first thermoplastic welding layer.

6. A packaging container according to claim 5, wherein said fully or partly removable inner sealing member is a tearable inner sealing member, said structural layer of said first laminate sealing member sheet material being a metallic foil layer having a thickness of 5 micrometers to 10 micrometers.

7. A packaging container according to claim 6, wherein said tearable inner sealing member comprises a second laminate sealing member sheet material comprising a metallic foil layer and a thermoplastic welding layer, said second laminate sealing member sheet material being joined to said first laminate sealing member sheet material by welding.

8. A packaging container according to claim 5, wherein said removable inner sealing member is a peelable inner sealing member and wherein said structural layer of said first laminate sealing member sheet material is a metallic foil layer having a thickness of 9 micrometers to 45 micrometers.

9. A packaging container according to claim 5, wherein a combined basis weight of said thermoplastic welding layer of said first laminate sealing member sheet material and said thermoplastic welding layer of said laminate body sheet material is from 25 g/m2 to 160 g/m2.

10. A packaging container according to claim 1, wherein said inner thermoplastic welding layer of said laminate base sheet material has a basis weight of 38 $g/m^2$ to 140 $g/m^2$.

11. A packaging container according to claim 1, wherein said laminate body sheet material comprises an outer polymeric layer being arranged on a surface of said container body facing away from said interior of said container body.

12. A packaging container according to claim 1, wherein said laminate base sheet material comprises an outer polymeric layer being arranged on a surface of said base disc facing away from said interior of said container body.

13. A packaging container according to claim 1, wherein a reinforcing rim is attached to said container body at one or both of said bottom end and said top end of said container body.

14. A packaging container according to claim 1, wherein said container wall comprises container wall portions connected by curved corner portions said curved corner portions having a radius of curvature of 5-60 mm.

15. A packaging container according to claim 14, wherein said container wall comprises four container wall portions being connected by four curved corner portions.

* * * * *